(12) United States Patent
Clark et al.

(10) Patent No.: US 10,467,609 B2
(45) Date of Patent: Nov. 5, 2019

(54) PRODUCTS IDENTIFYING CARRIER

(71) Applicant: Walmart Apollo, LLC, Bentonville, AR (US)

(72) Inventors: Jimmie R. Clark, Fayetteville, AR (US); Christopher S. Johnson, Pea Ridge, AR (US); Subodh K. Pandey, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/962,263

(22) Filed: Apr. 25, 2018

(65) Prior Publication Data

US 2018/0315034 A1 Nov. 1, 2018

Related U.S. Application Data

(60) Provisional application No. 62/490,931, filed on Apr. 27, 2017.

(51) Int. Cl.
*G06Q 20/18* (2012.01)
*G06Q 20/20* (2012.01)
(Continued)

(52) U.S. Cl.
CPC ........... *G06Q 20/18* (2013.01); *B62B 3/1404* (2013.01); *G06Q 10/087* (2013.01);
(Continued)

(58) Field of Classification Search
CPC .. G06Q 20/18; G06Q 30/0633; G06Q 10/087; G06Q 20/208; G06Q 20/203; G06Q 20/42
See application file for complete search history.

(56) References Cited

U.S. PATENT DOCUMENTS 5,640,002 A * 6/1997 Ruppert ............... G06K 7/0008
235/462.46
5,729,697 A * 3/1998 Schkolnick .......... G06Q 20/203
235/383
(Continued)

FOREIGN PATENT DOCUMENTS

DE 102004019132 11/2005
JP 2015524947 8/2015
(Continued)

OTHER PUBLICATIONS

Jain et al. "SmartCart". <https://www.ece.ucsb.edu/Faculty/Johnson/ECE189/final/smartcart.pdf>. 2013.*
(Continued)

*Primary Examiner* — Nathan A Mitchell
(74) *Attorney, Agent, or Firm* — Fitch, Even, Tabin & Flannery LLP

(57) ABSTRACT

In some embodiments, apparatuses and methods are provided herein useful to maintain an inventory of products within a product carrier. The product carrier utilizes a radio frequency (RF) blocking material and a RF reader disposed within an interior of the product carrier to identify products placed therein. The product carrier can further include an indicator on an exterior thereof to provide an indication regarding a status of the products within the product carrier.

18 Claims, 11 Drawing Sheets

(51) Int. Cl.
 *G06Q 10/08* (2012.01)
 *G06Q 30/06* (2012.01)
 *B62B 3/14* (2006.01)
 *G07G 1/00* (2006.01)
 *G06Q 20/42* (2012.01)

(52) U.S. Cl.
 CPC ......... *G06Q 20/203* (2013.01); *G06Q 20/208* (2013.01); *G06Q 30/0633* (2013.01); *G07G 1/009* (2013.01); *G07G 1/0081* (2013.01); *G06Q 20/42* (2013.01)

(56) References Cited

U.S. PATENT DOCUMENTS

| | | | |
|---|---|---|---|
| 6,032,127 A | 2/2000 | Schkolnick | |
| 7,934,647 B1* | 5/2011 | Mims | B62B 5/0096 235/383 |
| 7,944,354 B2 | 5/2011 | Kangas | |
| 8,427,317 B2 | 4/2013 | Hammad | |
| 9,230,249 B1* | 1/2016 | Vora | G06Q 20/202 |
| 2002/0170961 A1* | 11/2002 | Dickson | G06K 7/0008 235/383 |
| 2003/0015585 A1* | 1/2003 | Wike, Jr. | G06Q 20/343 235/383 |
| 2006/0208072 A1* | 9/2006 | Ku | G06K 7/0008 235/383 |
| 2006/0254815 A1 | 11/2006 | Humphrey | |
| 2008/0011836 A1* | 1/2008 | Adema | G06Q 10/00 235/383 |
| 2010/0123559 A1* | 5/2010 | Wilkinson | G06K 7/0008 340/10.4 |
| 2010/0263179 A1 | 10/2010 | Boldin | |
| 2012/0284132 A1* | 11/2012 | Kim | G07G 1/0081 705/20 |
| 2013/0226718 A1* | 8/2013 | Ascarrunz | G07G 1/0081 705/17 |
| 2014/0001258 A1* | 1/2014 | Chan | G06Q 10/0875 235/385 |
| 2014/0164176 A1* | 6/2014 | Kitlyar | G06Q 30/0633 705/26.8 |
| 2015/0006319 A1* | 1/2015 | Thomas | G06Q 30/0633 705/26.8 |
| 2015/0025969 A1* | 1/2015 | Schroll | G06Q 30/0633 705/14.53 |
| 2015/0127496 A1* | 5/2015 | Marathe | G06Q 10/087 705/28 |
| 2016/0180670 A1* | 6/2016 | Swope | G08B 13/246 340/568.5 |
| 2016/0189277 A1* | 6/2016 | Davis | G06Q 30/0633 705/26.8 |
| 2016/0325867 A1* | 11/2016 | Trundle | G08B 13/08 |
| 2017/0300980 A1* | 10/2017 | Soldate | G06Q 30/06 |
| 2018/0076891 A1* | 3/2018 | Agrawal | H04B 10/116 |

FOREIGN PATENT DOCUMENTS

| | | | |
|---|---|---|---|
| WO | 1996039674 | 12/1996 | |
| WO | 2005096237 | 10/2005 | |
| WO | WO-2016057610 A1 * | 4/2016 | ............. G06Q 30/06 |

OTHER PUBLICATIONS

"RFID Store". Retrieved from <https://www.halfbakery.com/idea/RFID_20Store> on Mar. 21, 2019.*

Y. Berdaliyev and A. P. James, "RFID-Cloud smart cart system," 2016 International Conference on Advances in Computing, Communications and Informatics (ICACCI), Jaipur, 2016, pp. 2346-2352.*

Tanushree et al. "Ingenious Shopping Cart: RFID Enabled for Automated Billing". IJCSMC, vol. 5, Issue. 5, May 2016, p. 209-214.*

Martin, Russ; "Adobe Introduces Shopping Bag of the Future"; http://marketingmag.ca/tech/adobe-introduces-shopping-bag-of-the-future-170750/; Mar. 23, 2016; pp. 1-3.

PCT; App. No. PCT/US2018/29509; International Search Report and Written Opinion dated Jun. 27, 2018.

* cited by examiner

PRODUCTS IDENTIFYING CARRIER

CROSS-REFERENCE TO RELATED APPLICATION

This application claims the benefit of U.S. Provisional Application No. 62/490,931, filed Apr. 27, 2017, which is incorporated herein by reference in its entirety.

TECHNICAL FIELD

This invention relates generally to product carriers and, more specifically, to smart product carriers.

BACKGROUND

Many retail locations are adding self check-out functionalities. These allow customers to handle product scanning and identification for purchase transactions. Unfortunately, without employee oversight, customer check-out transactions can result in errors. For example, customers can scan or identify items incorrectly which can result in the wrong products being purchased. In another example, customers can intentionally or inadvertently forego scanning products entirely. Accordingly, a system that identifies products and enables easy check-out will help avoid these types of errors.

BRIEF DESCRIPTION OF THE DRAWINGS

Disclosed herein are embodiments of systems, apparatuses and methods pertaining product carriers. This description includes drawings, wherein.

Figure 1:
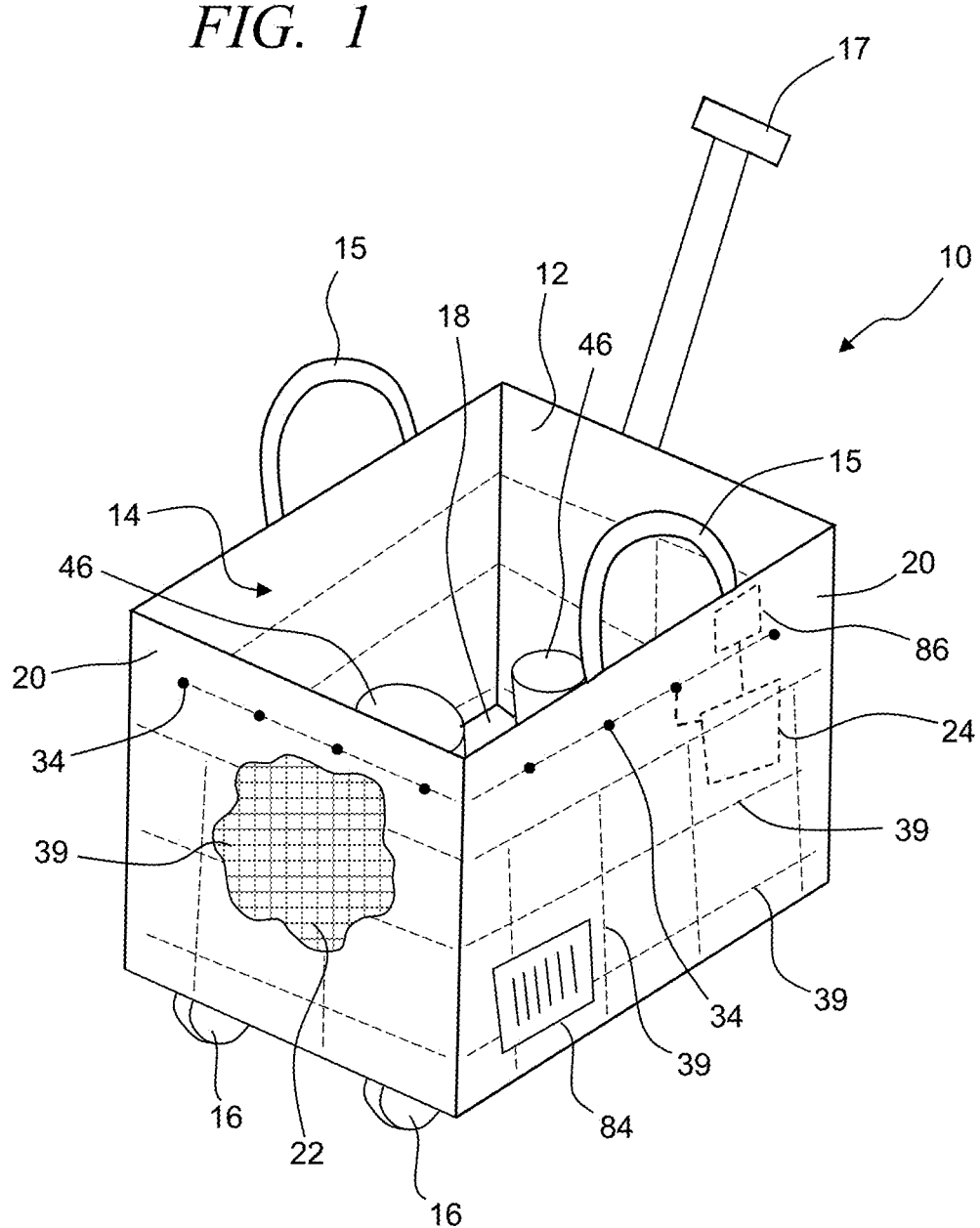
FIG. 1 is a perspective view of a product carrier in accordance with some embodiments.
Figure 2:
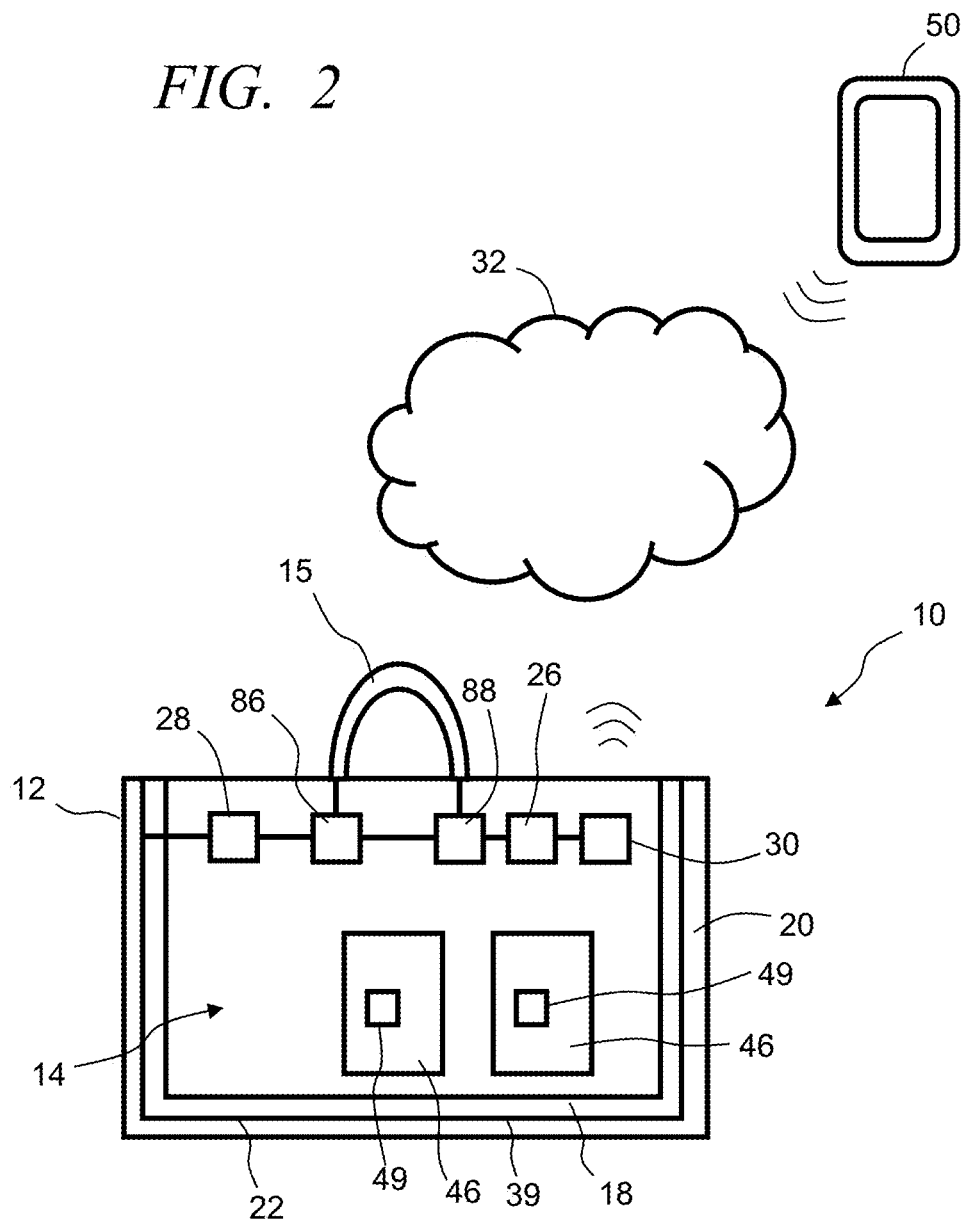
FIG. 2 is a cross-sectional view of a product carrier and mobile device in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to maintain an inventory of products within a product carrier. The product carrier utilizes a radio frequency (RF) blocking material and a RF reader disposed within an interior of the product carrier to identify products placed therein. The product carrier can further include an indicator on an exterior thereof to provide an indication regarding a status of the products within the product carrier.

The product carrier can advantageously sync or otherwise communicate with a user mobile device to achieve additional functionalities. For example, the product carrier can be configured to indicate whether the products in the product carrier are paid for or not. Further, a customer can utilize the product carrier to shop by placing items in the interior thereof and checkout using the synced mobile device. In other examples, the product carrier can be configured to indicate whether there are unidentified products in the product carrier and/or whether the product carrier is not synced with the user mobile device. In other approaches, the product carrier can be configured to indicate whether all of the products in a shopping list are within the product carrier.

A product carrier 10 capable of these functions is shown in FIGS. 1-12. The product carrier 10 includes wall portions 12 at least partially enclosing an interior 14 thereof. The product carrier 10 can be any suitable structure, such as a flexible or semi-rigid bag, a basket, a cart, or the like. Further, the product carrier 10 can be configured to be carried by a user using handles 15 and/or can include wheels 16 or other suitable mechanisms to roll or tow the product carrier 10 using a handle 17 instead of carrying it.

As shown in FIG. 1, the product carrier wall portions 12 can include a bottom portion 18 and side wall portions 20. The wall portions 12 include a sufficient amount of RF blocking material 22, which can be disposed throughout the wall portions 12, in a suitable pattern, on desired portions, and so forth. The RF blocking material 22 is configured to isolate RF signals of tags or chips disposed within the interior 14 and block external RF signals from entering the interior 14. As such, the product carrier 10 can take any desirable shape and size so long as a suitable amount of RF blocking is present.

Figure 3:
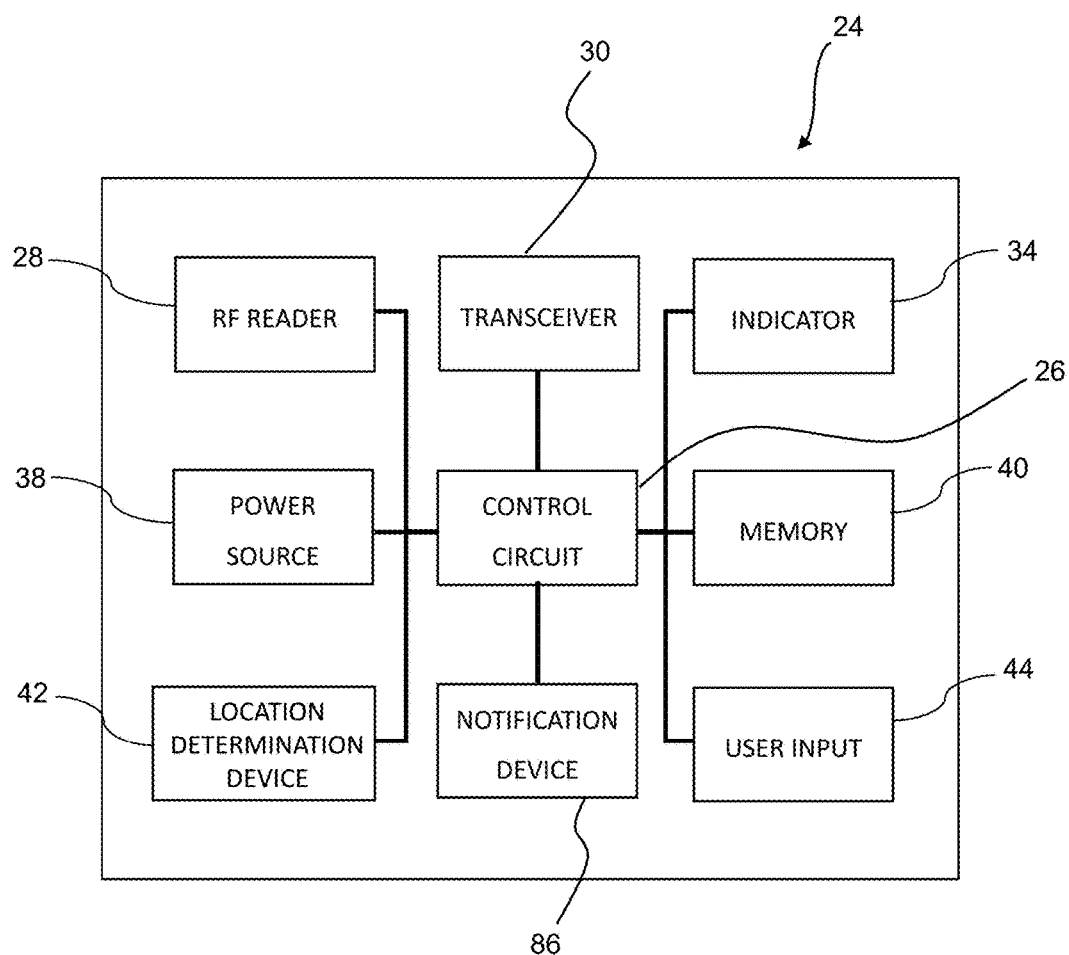
FIG. 3 is a diagrammatic view of an electronic assembly for a product carrier in accordance with some embodiments.

The product carrier 10 can further include an electronic assembly 24, as shown in FIG. 3. The electronic assembly 24 can include a control circuit 26, a RF reader 28 disposed within the interior 14 to read any RF tags therein, a transceiver 30 configured to send signals over any suitable communication network 32, such as Bluetooth, radio, near field communication, Wi-Fi, and so forth, an indicator 34 disposed at least partially on an exterior 36 of the product carrier 10, and a power source 38 configured to provide power to the components of the electronic assembly 24. The power source 38 can take any desired form. For example, the power source 38 can be rechargeable, either by a wired or wireless, induction connection. In another example, the power source 38 can be replaceable. By one approach, the reader 28 can be a standalone component mounted or secured to the product carrier 10 in any suitable configuration. By another approach, the reader 28 can include a mesh or other wire 39 extending through some or all of the product carrier wall portions 12 so that the reader 28 can generate a multi-directional field for reading tags within the interior 14. So configured, the reader 28 can be an antenna that utilizes one or multiple loops around the product carrier interior 14 to generate an electrical field therein to read the tags. If desired, the wires 39 can utilize, be incorporated into, or be a portion of the RF blocking material 22. By some approaches, the electronic assembly 24 can further include a memory 40, a location determination device 42, and/or a user input 44, as discussed in more detail below.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuits described herein may be configured (for example, by using corresponding programming stored in a memory as will be well understood by those skilled in the art) to carry out one or more of the steps, actions, and/or functions described herein.

Advantageously, the product carrier 10 can be utilized to identify products 46 as they are placed within the interior 14 thereof while shopping at a retail location 48. More specifically, each product 46 can have a RF tag 49 incorporated therein or mounted thereto, such as with a label or other product packaging. The RF tags 49 can include product identification information or pointer information for determining the identification of the product so that the reader 28 can read the tags 49 and the control circuit 26 can identify the associated product 46.

Figure 4:
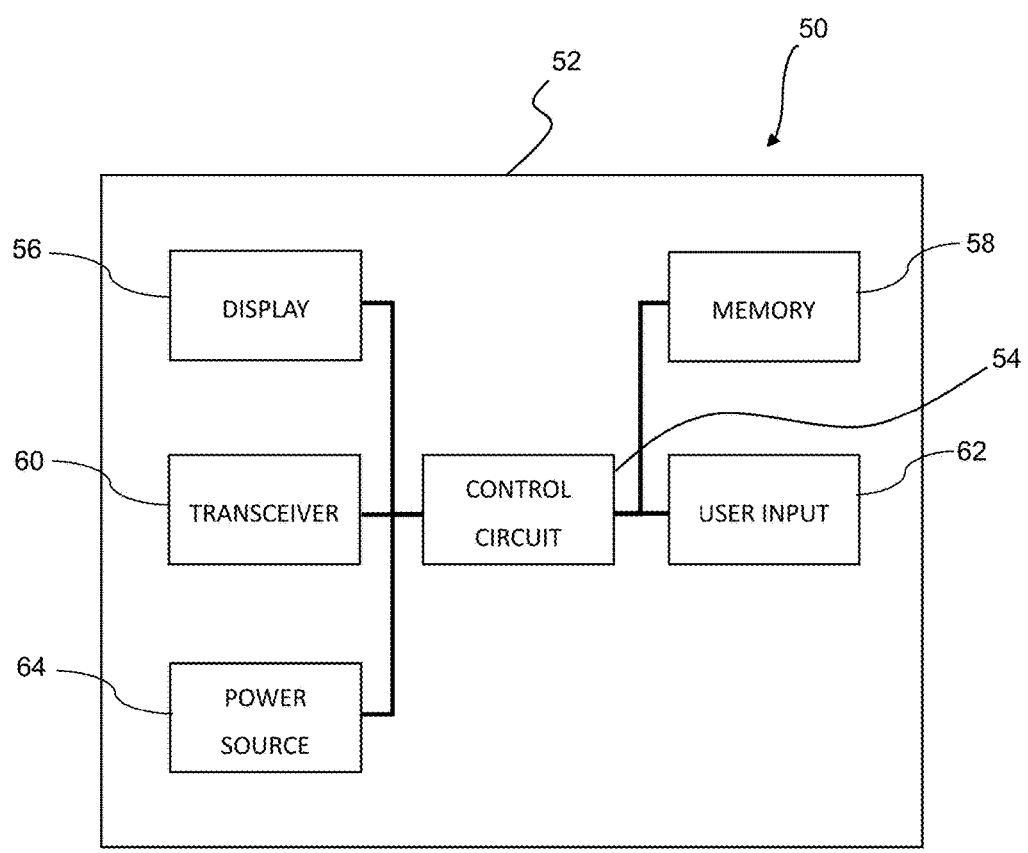
FIG. 4 is a diagrammatic view of an electronic assembly for a mobile device in accordance with several embodiments.

As discussed above, the product carrier electronic assembly 24 can sync with a user mobile device 50, such as a smart phone, tablet, or the like, to provide additional functionalities. The user mobile device 50 can be configured as commonly understood with an electronic assembly 52 that, as shown in FIG. 4, includes a control circuit 54, a display 56, a memory 58, a transceiver 60, a user input 62, and a power source 64 to provide power to the other components of the electronic assembly 52.

So configured, the product carrier control circuit 26 can send the product identification information to the user mobile device 50. By a first approach, the user mobile device 50 can show the identified products 46 on the display 56 so that the user can keep a running list of the products 46 that have been collected. More specifically, as the customer places products 46 into the product carrier interior 14, the electronic assembly 24 reads information from the tags 49 on the products 46 and sends the information to the user mobile device 50. The user mobile device 50 then compiles the identified products 46 into a list and shows the products 46 on the display 56.

By a further approach, the user mobile device can be running suitable software, such as in the form of an application, that enables the user to purchase the products 46 disposed within the product carrier 10. More specifically, the compiled list of products 46 can be placed in a virtual cart for later purchase. Thereafter, the software can provide the user the ability to purchase the compiled products 46 using inputted banking or payment information, such as by selection of a suitable user input 62.

Figure 5:
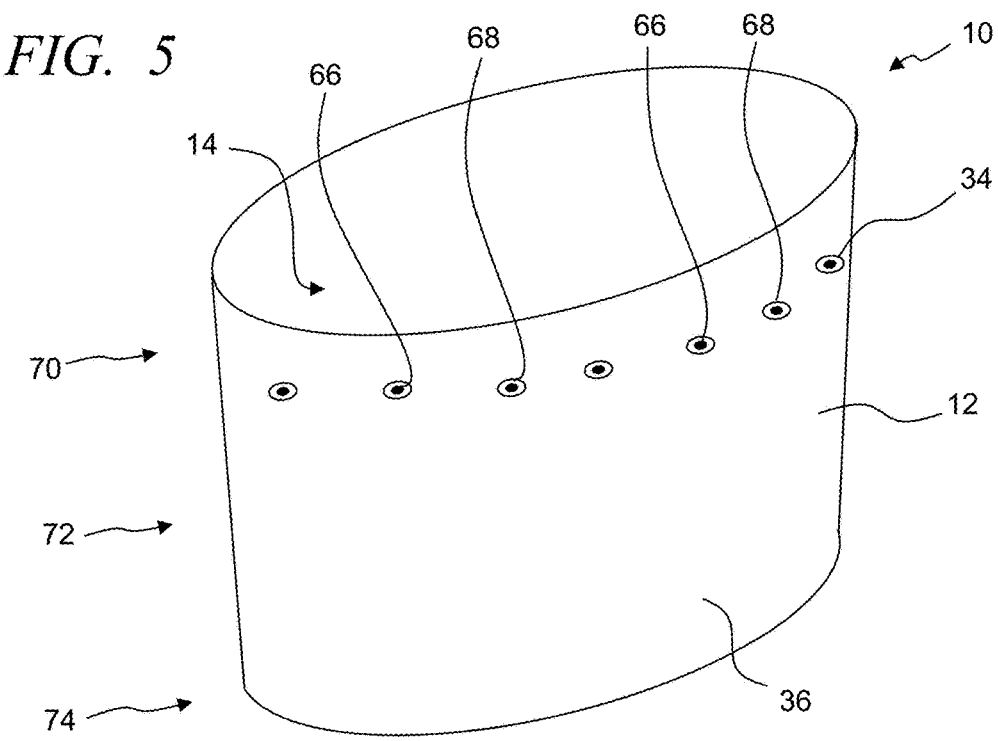
FIG. 5 is a perspective view of a first example indicator for a product carrier in accordance with some embodiments.
Figure 6:
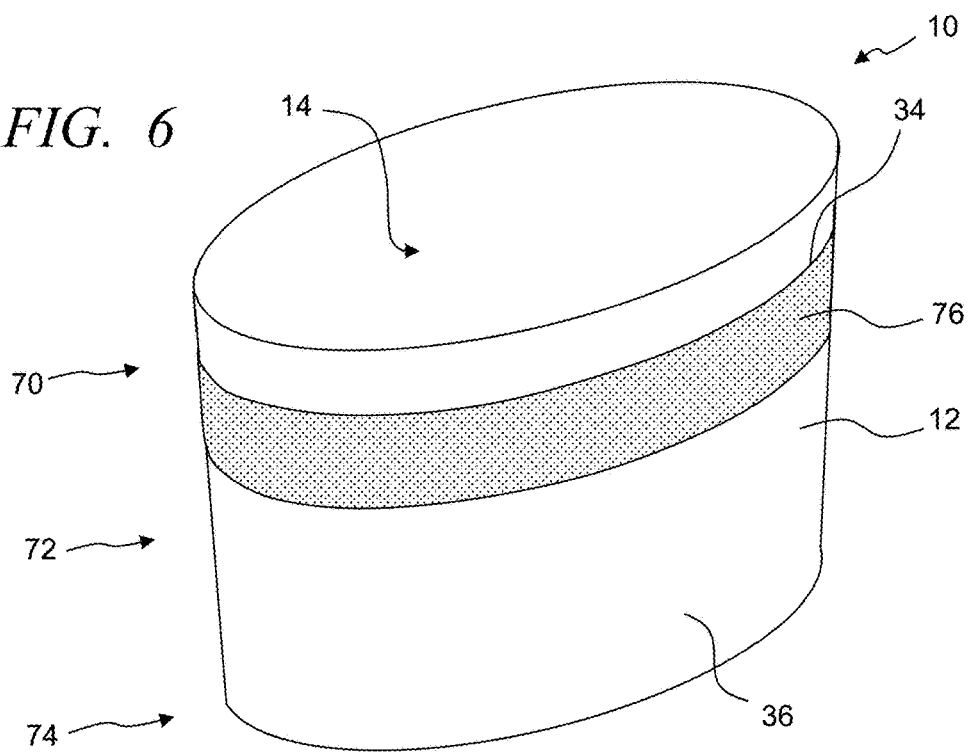
FIG. 6 is a perspective view of a second example indicator for a product carrier in accordance with several embodiments.
Figure 7:
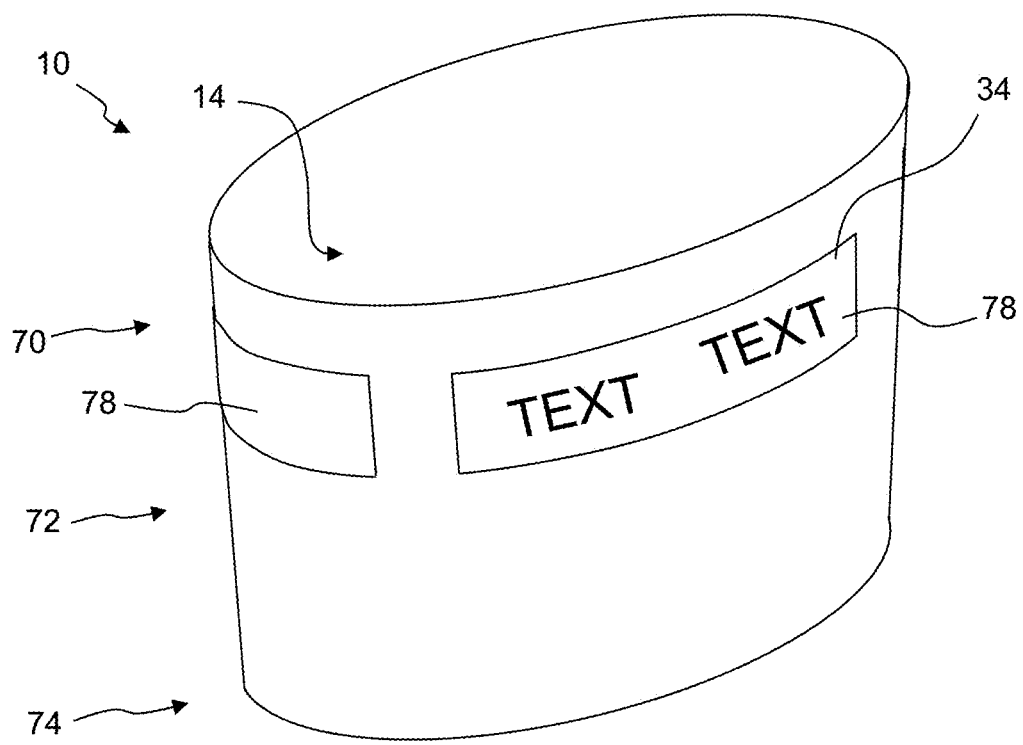
FIG. 7 is a perspective view of a third example indicator for a product carrier in accordance with some embodiments.
Figure 8:
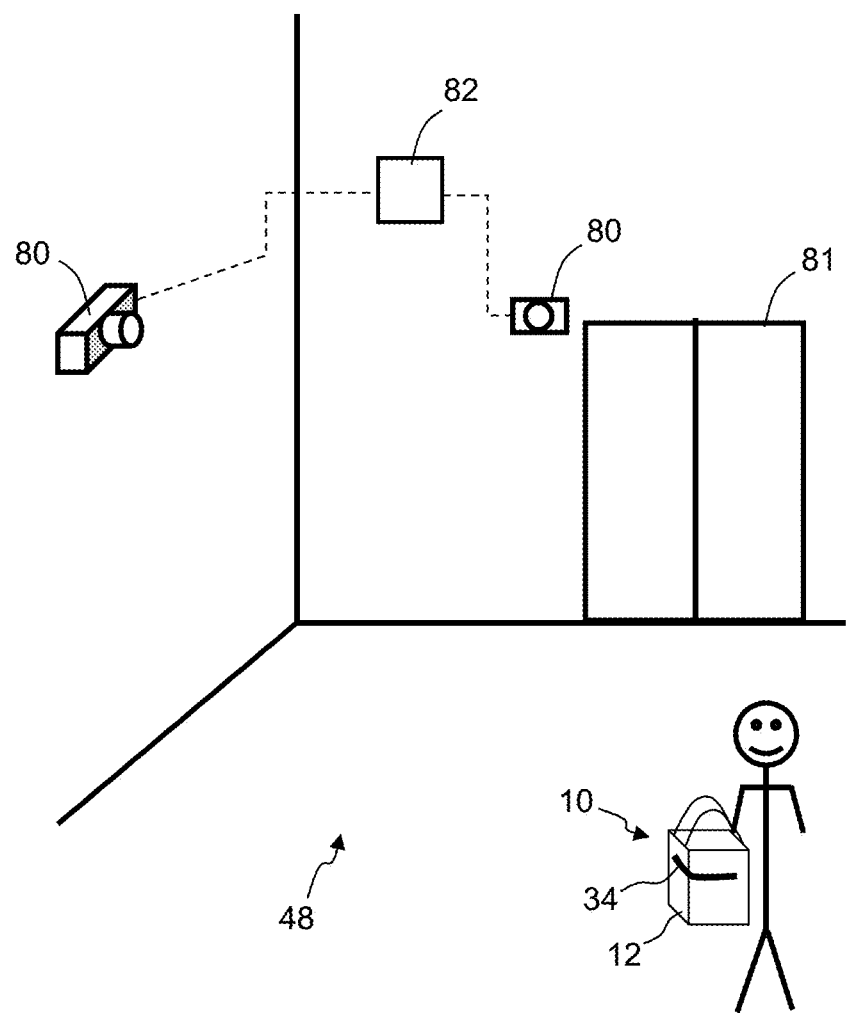
FIG. 8 is a perspective, sectional view of a retail location showing electronic imagers monitoring a product carrier in accordance with several embodiments.

Example indicators 34 are shown in FIGS. 5-7. In one form, shown in FIG. 5, the indicator is a light source 66, such as a light emitting diode (LED), mounted to or visible through the product carrier exterior 36. For example, the LED 66 can be adhered, sewn, or otherwise secured to the exterior 36, can be mounted within layers of the product carrier wall portions 12 to project through an opening 68 in the exterior 36 to be visible. By a further approach, the indicator 34 of this form can include multiple LEDs 66 spaced around the circumference of the product carrier 10 so that there is a visible LED 66 on every side of the product carrier 10 to maximize potential visibility. In the illustrated form, the LEDs 66 are disposed in a spaced configuration along a circumferential ring of the product carrier 10 within a top portion 70 thereof. Of course, the LEDs 66 can be disposed in an intermediate portion 72, bottom portion 74, or combinations thereof. In another form, as shown in FIG. 6, the indicator 34 can be a flexible strip or array of LEDs 76 mounted generally horizontally across the product carrier 10 in one or more of the portions 70, 72, 74 thereof. In yet another form, as shown in FIG. 7, the indicator 34 can be a flexible display 78, such as an OLED display, disposed in a similar manner.

So configured, the indicator 34 can be used to provide a visual indication of a status of products 46 in the product carrier 10. In a first form, the color emitted by the light sources 66, 76, 78 indicates a status of the products 46 in the product carrier 10. The status indicators can include one or more of: all products 46 within the product carrier 10 have been paid for via purchase using the mobile device 50, at least one of the products 46 within the product carrier 10 has not been paid for, at least one of the products 46 within the product carrier 10 has not been identified, the electronic assembly 24 is not synced with the mobile device 50, and so forth. For example, a green light can indicate that the products 46 are paid for, a red light can indicate unpurchased products 46, a yellow light can indicate unidentified products 46, and a blue light can indicate that the electronic assembly 24 is not synced. Further, the status indicator 34 can be periodically or continually updated based on received information. For example, if a customer purchases the products 46 within the product carrier 10, the light source 66, 76, 78 will change from red to green. Thereafter, if the customer adds another product 46, the light source 66, 76, 78 would change back to red.

In another approach, the indicators 34 utilizing an array of LEDs 76 and/or the display 78 can present textual information. By one approach, the array of LEDs 76 or display 78 can show the current status of the product carrier 10 and the products 46 therein. For example, if the products 46 within the product carrier 10 are purchased, the indicator 34 can say "purchased," "good", "ok," and so forth; if there is at least one product 46 not purchased, the indicator 34 can say "pending," "stop," and so forth; if there is a product 46 that cannot be identified, the indicator 34 can say "unidentified item," "error," "problem," and so forth; and if the mobile device 50 is not synced with the product carrier 10, the indicator 34 can say "not synced," "pairing issue," and so forth.

In an alternative, or additional, approach, the indicator 34 can utilize non-visible light, such as infrared, ultraviolet, etc. Non-visible light allows the product carrier 10 to provide a status indication without informing customers within the store. In order to identify and process the non-visible status indications, the retail location 48 can mount or install cameras 80 or other electronic imagers at or near desired locations 81, such as entrances, exits, bathrooms, offices, backrooms, and so forth. The cameras 80 can be configured to identify the non-visible light utilized by the indicator 34. The cameras 80 can then be in communication, either wired or wireless, with a control circuit 82 that is configured to interpret the media, video or images, captured by the cameras 80 to determine any status indicators viewed by the cameras 80.

So configured, the cameras 80 can capture media of any product carriers 10 brought into a field-of-view thereof by customers. The media is then analyzed by the control circuit 82, utilizing any suitable analysis software, to determine the status of any indicators 34 within the media. Based on the analysis, the control circuit 82 can perform secondary actions. The secondary actions can include sounding an alarm if the analysis indicates that a customer is taking unpurchased products 46 out of permitted areas, creating a task for an associate at the retail location 48 to meet with the customer associated with the product carrier 10, check out an area, check a product, and so forth.

The control circuit 82 can further be configured to identify each product carrier 10. For example, the product carrier 10 can include an identifying marking 84, such as textual information, a machine readable code, etc., that the control circuit 82 can identify from analysis of the media captured by the cameras 80. In another example, the electronic assembly 24 can send out identification information to the control circuit 82 to identify each product carrier 10. So configured, if desired, the retail location 48 can utilize multiple cameras 80 disposed throughout the store so that a given product carrier 10 can be tracked through the retail location 48. Accordingly, if the control circuit 82 loses track of a given product carrier 10 without identifying that the customer purchased the products 46, the control circuit 82 can then take a secondary action, such as sounding an alarm, creating a task for an associate to proceed to the last known location of the product carrier 10, sending out an alert with the identification of the product carrier 10, and so forth.

By a further approach, the indicators 34 utilizing an array of LEDs 76 and/or the display 78 can present a pattern 84 to indicate the status of products 46 within the product carrier 10. For example, the indicator 34 can have a first pattern to display that the products 46 within the product carrier 10 are purchased, a second pattern to display that at least one of the products 46 within the product carrier 10 is not purchased, and so forth. Advantageously, utilizing a pattern allows the control circuit 82 to analyze media of the indicator 34 to determine whether the pattern is being obscured in some way. While the pattern 84 may be unintentionally obscured, covering the indicator 34 can also demonstrate an intention to bypass security. Accordingly, if the control circuit 82 determines that the indicator 34 shows that the product carrier 10 contains one or more products 46 that are not purchased and determines that the indicator 34 is being actively obscured, the control circuit 82 can take one of the secondary actions. Active obscuring, for example, can be indicated by multiple readings showing the pattern 84 being obscured.

With all of the above embodiments, the product carrier electronic assembly 24 can include a notification device 86 to notify the customer of any issues with the product carrier 10, such as in conjunction with the secondary actions described above. By one approach, the notification device 86 can be a vibration mechanism configured to vibrate in response to reception of a signal from the control circuit 26. The notification device 86 can be disposed in the handle 15 of the product carrier 10 or adjacent thereto to vibrate the hand of the customer to notify the customer of an issue. Other methods of notification can also be used, such as emitting a noise or alarm, flashing lights, or the like. Of course, the notification device 86 can also be mounted to other portions of the product carrier 10.

The product carrier 10 can also be utilized to monitor the status of a shopping list and notify the customer using the indicator 34 and/or notification device 86 of whether all items on the shopping list have been collected. For example, the customer can identify products 46 for the shopping list within the software on the mobile device 50. Thereafter, the mobile device 50 can compare the products 46 deposited into the product carrier interior 14 and identified by the RF tags 49 thereof. Until all of the products 46 are collected within the product carrier 10, the control circuit 26 can cause the indicator 34 to be in a first state, such as a particular color or with particular text or pattern. Further, the mobile device 50 can continuously update the status of the shopping list, identifying the products 46 that have been collected and the products 46 still needed. After all of the products 46 in the shopping list have been collected, the control circuit 26 can cause the indicator 34 to change to a second state, different than the first state. After all the products 46 are collected, the mobile device 50 can display a completed task.

In some approaches, the product carrier 10 can be used to identify perishable products 46, including produce, refrigerated products, frozen products, and the like. Thereafter, the electronic assembly 24 can monitor the time that the perishable products 46 are within the product carrier 10 and notify the customer using the indicator 34 and/or mobile device 50 when a time period has passed that corresponds with the particular perishable product 46.

In one form, the electronic assembly 24 can include a tension or motion sensor 88 to determine whether the customer has lost or abandoned the product carrier 10. In such an instance, an associate may not find the product carrier 10 until after the perishable product 46 has spoiled or otherwise become unsellable. To avoid this, the control circuit 26 can start the timer if the tension or motion sensor 88 indicates that the product carrier 10 has not be carried or moved for a predetermined amount of time, such as 2-10 minutes, and more specifically 3-5 minutes.

The length of the timer can be dependent on the type of product 46. For example, for a frozen product 46, the timer can be relatively shorter, such as 5 minutes. For a chilled product 46, the timer can be relatively longer, such as 15 minutes. After the timer has expired, the control circuit 26 sends a notification to the store control circuit 82 that notifies the store control circuit 82 that the product carrier 10 contains perishable products 46 has likely been abandoned by the customer. The notification message can further include an identification of the particular product carrier 10. Further, in embodiments where the electronic assembly 24 includes the location determination device 42, the notification message can include a location of the product carrier 10 so that an associate can easily find the carrier 10.

The location determination device 42 can take any suitable form. In one form, the device 42 can utilize micro or geo-locationing. In another form, the device 42 can utilize beacon signals received from product displays or other structures within the retail location 48. In another form, the device 42 can utilize a non-visible modulation of lights within the retail location 48. In yet another form, the device 42 can utilize global positioning system circuitry. By another approach, the store control circuit 82 can track the location of the product carrier 10 by analyzing media captured by the cameras 80 within the retail location 48.

The product carrier 10 can be owned by a particular customer or can be available at the retail location 48 for use by any customers. The customers can put one or more bags in the interior 14 of the product carrier 10 to protect the interior 14 thereof from soiling. Additionally, a customer can utilize multiple product carriers 10 during a shopping trip, with each carrier 10 communicating with the mobile device 50.

Figure 9:
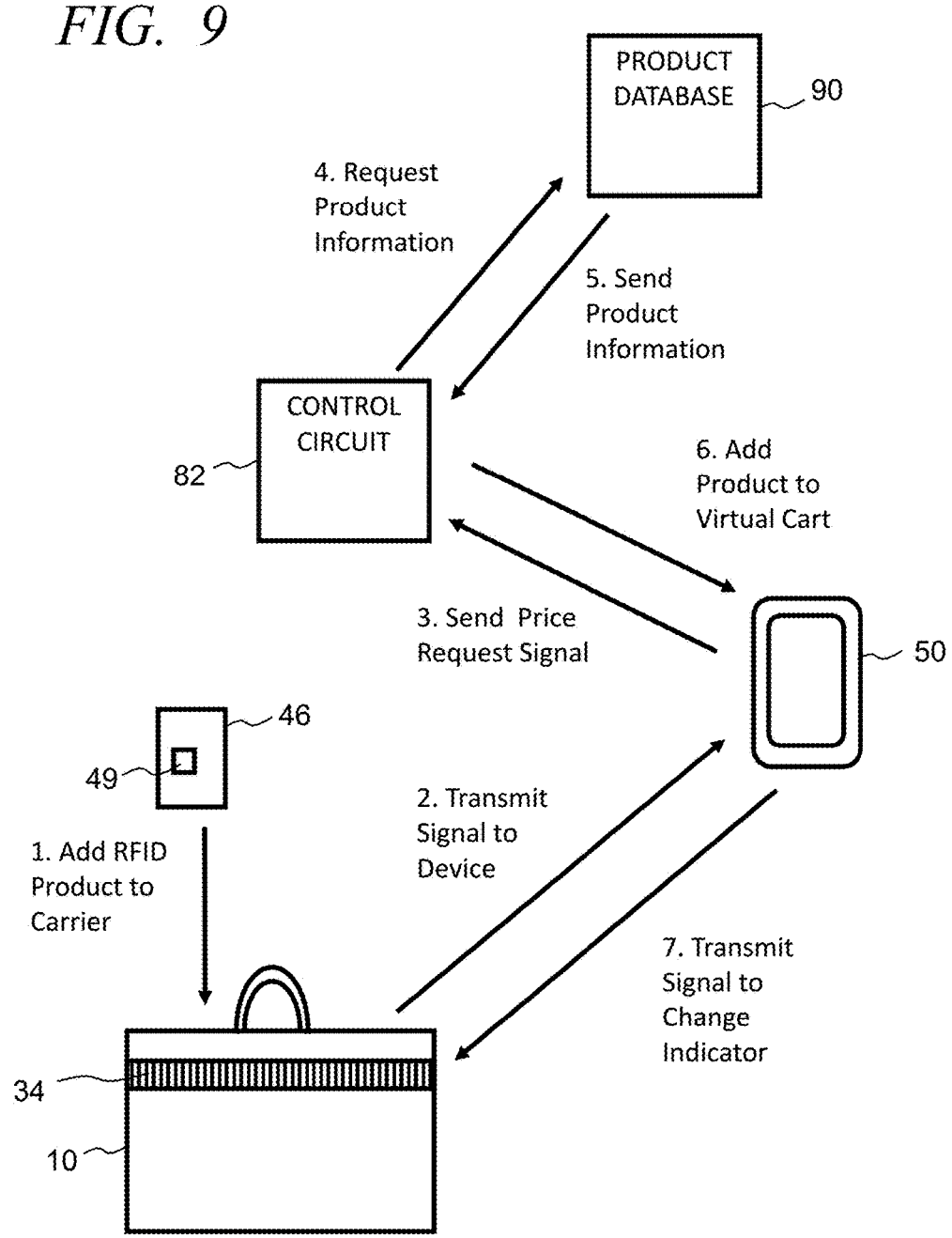
FIG. 9 is a flow diagram in accordance with some embodiments.

So configured, as shown in FIG. 9, one example process begins with a first step of putting a product 46 having an associated RFID tag 49 into the product carrier 10. In a second step, the carrier control circuit 26 then causes a signal to be transmitted to the user mobile device 50 to identify the added product 46. In a third step, the user mobile device 50 sends a price request signal for the added product 46 to the store control circuit 82. In a fourth step, the store control circuit 82 sends a product information request to a product database 90 regarding the added product 46. The product information can include a price of the product 46, any applicable sales or discount information, as well as other suitable information. In a fifth step, the product database 90 sends the product information to the store control circuit 82. In a sixth step, the store control circuit 82 sends the product information to the user mobile device 50 so that the added product 46 can be added to a virtual cart being maintained on the user mobile device 50. In a seventh step, if necessary, the user mobile device 50 can transmit a signal to the carrier control circuit 26 to change the indicator 34 thereof, such as for the various reasons set forth above.

Figure 10:
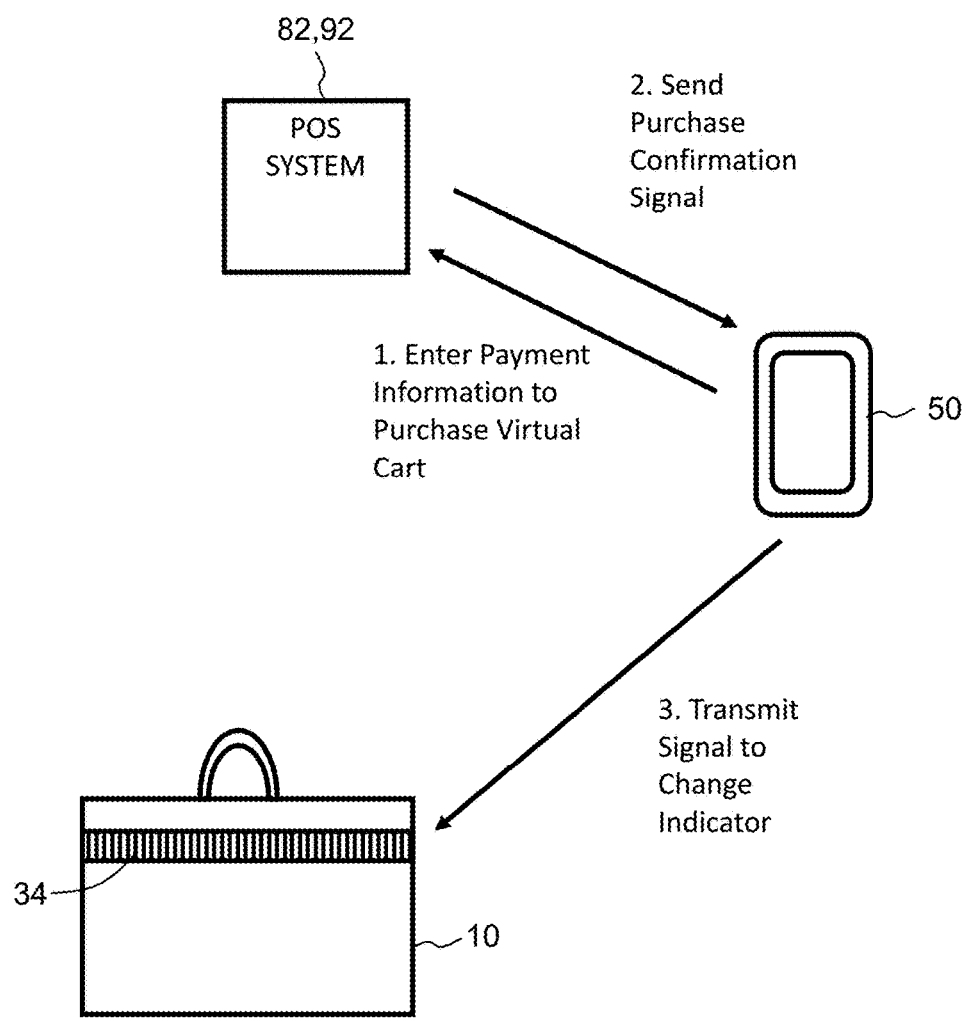
FIG. 10 is a flow diagram in accordance with several embodiments.

A virtual cart check-out process is shown in FIG. 10. After desired products 46 have been collected, placed in the product carrier 10, and compiled in the virtual cart, as set forth above, the customer can then be provided with the option to purchase the products 46 using the user mobile device 50. In a first step, the user enters and transmits purchase information for the virtual cart to a point-of-sale (POS) system 92 for the store. In one form, the POS system 92 can include or be part of the store control circuit 82. The purchase information includes a product listing, pricing information, including product prices, any applicable tax, and so forth, and payment information, which can utilize any suitable payment method, such as credit card information, debit card information, bank account information, other methods that utilize intermediaries to those payment options, and so forth. Of course, the customer can pre-enter bank or credit/debit card information and store the information on the user mobile device. In a second step, the POS system 92 processes the transaction and sends a purchase confirmation signal to the user mobile device 50. Then, in a third step, the user mobile device 50 transmits a purchase confirmation signal to the carrier control circuit 26 to change the indicator to reflect that the products 46 contained therein have been purchased.

In some embodiments, a self check-out system for a retail location is described herein that includes a product carrier having an exterior and a partially enclosed interior that is at least partially bounded by a radio frequency blocking material. The product carrier is configured to be movable by a customer and receive products gathered by the customer while shopping. The system further includes an electronic assembly of the product carrier that includes: a radio frequency identification (RFID) tag reader configured to reader RFID tags of products placed within the interior of the product carrier; a transceiver; an indicator disposed at least partially on the exterior of the product carrier; and a control circuit. The control circuit is configured to identify products placed in the product carrier interior based on data from the RFID tag reader; sync with a user communication device to maintain an inventory of the products in the product carrier interior and receive payment data therefrom; operate the indicator to provide a first indication on the exterior of the product carrier in response to determining that there are products that have not been paid for within the product carrier interior; and operate the indicator to provide a second indication on the exterior of the product carrier in response to determining that all products within the product carrier interior have been paid for.

By several approaches, the indicator is one or more light sources, and the first and second indications are different colors. By other approaches, the indicator is a screen, and the first and second indications are different textual information.

By some approaches, the system further includes: cameras mounted within the retail location adjacent to an exit thereof that are configured to capture images of the product carrier; and a central control circuit configured to: analyze the images to determine whether the indicator is providing the first indication; and generate an alarm signal in response to determining that the indicator is providing the first indication. By further approaches, the first and second indications can utilize non-visible light; and the cameras can be configured to identify the non-visible light. By yet further approaches, the first indication comprises a pattern; and the central control circuit is further configured to generate an alarm signal in response to determining that the pattern is interrupted or obscured. By further approaches, the electronic assembly further includes a motion or tension sensor; the control circuit is configured to generate a signal to the central control circuit in response to a predetermined amount of time passing without the motion or tension sensor providing a reading; and the central control circuit is configured to create a task for an associate to retrieve the product carrier.

By several approaches, the control circuit is further configured to operate the indicator to provide a third indication on the exterior of the product carrier in response to determining that there is an unidentified product in the product carrier interior. By further approaches, the control circuit is further configured to operate the indicator to provide a fourth indication on the exterior of the product carrier in response to determining that the control circuit is not synced with the user communication device.

By some approaches, the control circuit is further configured to: determine whether any of the products in the product carrier interior are perishable, and operate the indicator to provide a perishable indication after a predetermined amount of time has passed in response to determining that at least one product in the product carrier interior is perishable.

Figure 11:
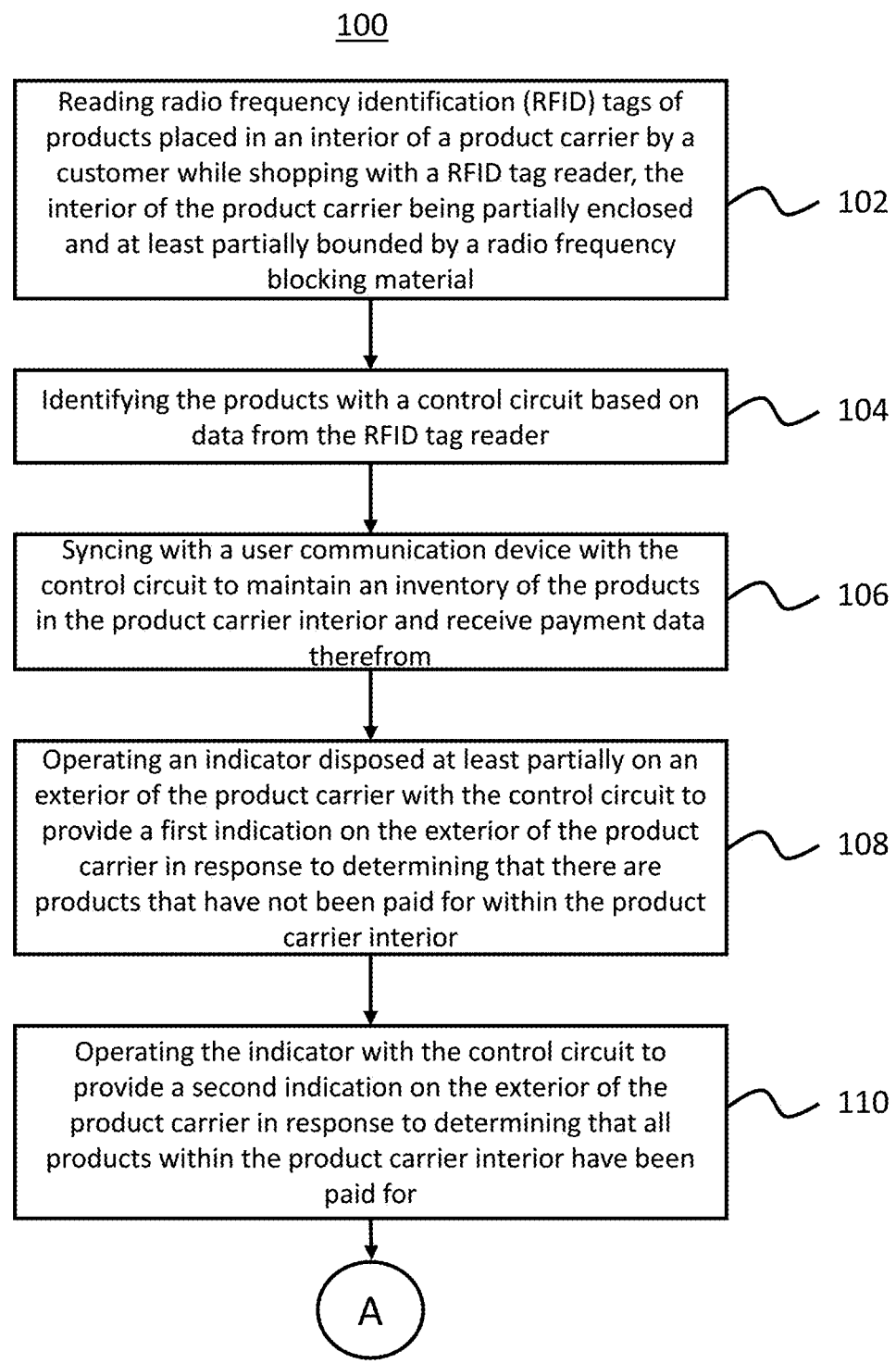
FIG. 11 is a flowchart in accordance with some embodiments.
Figure 12:
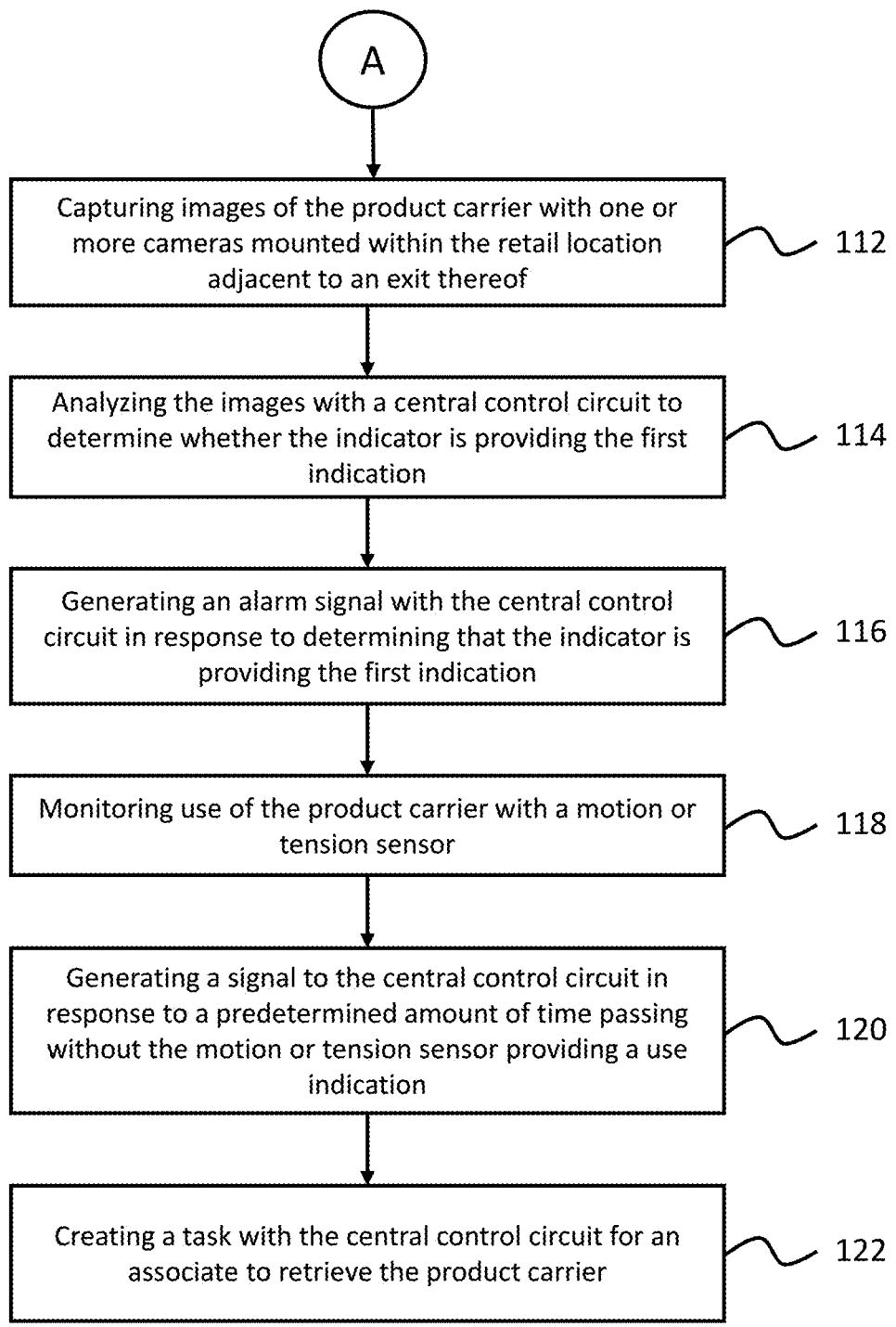
FIG. 12 is a flowchart in accordance with several embodiments.

In several forms and as shown in FIGS. 11 and 12, a method 100 for self check-out within a retail location is described herein that includes: reading 102 radio frequency identification (RFID) tags of products placed in an interior of a product carrier by a customer while shopping with a RFID tag reader, the interior of the product carrier being partially enclosed and at least partially bounded by a radio frequency blocking material, the product carrier configured to be movable by a customer; identifying 104 the products with a control circuit based on data from the RFID tag reader; syncing 106 with a user communication device with the control circuit to maintain an inventory of the products in the product carrier interior and receive payment data therefrom; operating 108 an indicator disposed at least partially on an exterior of the product carrier with the control circuit to provide a first indication on the exterior of the product carrier in response to determining that there are products that have not been paid for within the product carrier interior; operating 110 the indicator with the control circuit to provide a second indication on the exterior of the product carrier in response to determining that all products within the product carrier interior have been paid for.

By some approaches, operating 108 the indicator to provide the first indication includes operating a light source to illuminate in a first color; and operating 110 the indication to provide the second indication includes operating a light source to illuminate in a second color. By other approaches, operating 108 the indicator to provide the first indication includes operating a screen to display first textual information; and operating 110 the indication to provide the second indication includes operating a screen to display second textual information.

By several approaches, the method 100 further includes: capturing 112 images of the product carrier with one or more cameras mounted within the retail location adjacent to an exit thereof; analyzing 114 the images with a central control circuit to determine whether the indicator is providing the first indication; and generating 116 an alarm signal with the central control circuit in response to determining that the indicator is providing the first indication. By further approaches, operating 108 the indicator to provide the first indication comprises providing the first indication in non-visible light. By yet further approaches, the first indication is a pattern; and generating 116 the alarm signal further includes generating an alarm signal in response to determining that the pattern is interrupted or obscured. By further approaches, the method 100 further includes: monitoring 118 use of the product carrier with a motion or tension sensor; generating 120 a signal to the central control circuit in response to a predetermined amount of time passing without the motion or tension sensor providing a use indication; and creating 122 a task with the central control circuit for an associate to retrieve the product carrier.

By some approaches, the method 100 further includes operating the indicator with the control circuit to provide a third indication on the exterior of the product carrier in response to determining that there is an unidentified product in the product carrier interior.

By several approaches, the method 100 further includes operating the indicator with the control circuit to provide a fourth indication on the exterior of the product carrier in response to determining that the control circuit is not synced with the user communication device.

By some approaches, the method 100 further includes: determining whether any of the products in the product carrier interior are perishable with the control circuit; and operating the indicator to provide a perishable indication after a predetermined amount of time has passed in response to determining that at least one product in the product carrier interior is perishable.

In some embodiments, a shopping list status indication system for a retail location is described herein that includes a product carrier having an exterior and a partially enclosed interior at least partially bounded by a radio frequency blocking material. The product carrier is configured to be movable by a customer and receive products gathered by the customer while shopping. The system further includes an electronic assembly of the product carrier. The electronic assembly includes: a radio frequency identification (RFID) tag reader configured to read RFID tags of products placed within the interior of the product carrier; a transceiver; an indicator disposed at least partially on the exterior of the product carrier; and a control circuit. The control circuit is configured to: identify products placed in the product carrier interior based on data from the RFID tag reader; sync with a user communication device to maintain an inventory of the products in the product carrier interior and receive shopping list data therefrom, the shopping list data including a list of products intended for purchase; operate the indicator to provide a first indication on the exterior of the product carrier in response to determining that there are products identified in the shopping list data that are not within the product carrier interior; and operate the indicator to provide a second indication on the exterior of the product carrier in response to determining that all products identified in the shopping list data are within the product carrier interior.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A self check-out system for a retail location, the system comprising:
   a product carrier having an exterior and a partially enclosed interior at least partially bounded by a radio frequency blocking material, the product carrier configured to be movable by a customer and receive products gathered by the customer while shopping;
   an electronic assembly of the product carrier, the electronic assembly comprising:
   a radio frequency identification (RFID) tag reader configured to read RFID tags of products placed within the interior of the product carrier;
   a transceiver;
   an indicator disposed at least partially on the exterior of the product carrier; and
   a control circuit configured to:
   identify products placed in the product carrier interior based on data from the RFID tag reader;
   sync with a user communication device to maintain an inventory of the products in the product carrier interior and receive payment data therefrom;
   operate the indicator to provide a first indication on the exterior of the product carrier in response to determining that there are products that have not been paid for within the product carrier interior; and
   operate the indicator to provide a second indication on the exterior of the product carrier in response to determining that all products within the product carrier interior have been paid for;
   cameras mounted within the retail location adjacent to an exit thereof and configured to capture images of the product carrier; and
   a central control circuit configured to:
   analyze the images to determine whether the indicator is providing the first indication; and
   generate an alarm signal in response to determining that the indicator is providing the first indication.

2. The system of claim 1, wherein the indicator comprises one or more light sources, and the first and second indications are different colors.

3. The system of claim 1, wherein the indicator comprises a screen, and the first and second indications comprise different textual information.

4. The system of claim 1, wherein the first and second indications utilize non-visible light; and the cameras are configured to identify the non-visible light.

5. The system of claim 1, wherein the first indication comprises a pattern; and the central control circuit is further configured to generate an alarm signal in response to determining that the pattern is interrupted or obscured.

6. The system of claim 1, wherein the electronic assembly further comprises a motion or tension sensor; the control circuit is configured to generate a signal to the central control circuit in response to a predetermined amount of time passing without the motion or tension sensor providing a reading; and the central control circuit is configured to create a task for an associate to retrieve the product carrier.

7. The system of claim 1, wherein the control circuit is further configured to operate the indicator to provide a third indication on the exterior of the product carrier in response to determining that there is an unidentified product in the product carrier interior.

8. The system of claim 1, wherein the control circuit is further configured to operate the indicator to provide a fourth indication on the exterior of the product carrier in response to determining that the control circuit is not synced with the user communication device.

9. The system of claim 1, wherein the control circuit is further configured to:
  determine whether any of the products in the product carrier interior are perishable, and
  operate the indicator to provide a perishable indication after a predetermined amount of time has passed in response to determining that at least one product in the product carrier interior is perishable.

10. A method for self check-out within a retail location, the method comprising:
  reading radio frequency identification (RFID) tags of products placed in an interior of a product carrier by a customer while shopping with a RFID tag reader, the interior of the product carrier being partially enclosed and at least partially bounded by a radio frequency blocking material, the product carrier configured to be movable by a customer;
  identifying the products with a control circuit based on data from the RFID tag reader;
  syncing with a user communication device with the control circuit to maintain an inventory of the products in the product carrier interior and receive payment data therefrom;
  operating an indicator disposed at least partially on an exterior of the product carrier with the control circuit to provide a first indication on the exterior of the product carrier in response to determining that there are products that have not been paid for within the product carrier interior;
  operating the indicator with the control circuit to provide a second indication on the exterior of the product carrier in response to determining that all products within the product carrier interior have been paid for;
  capturing images of the product carrier with one or more cameras mounted within the retail location adjacent to an exit thereof;
  analyzing the images with a central control circuit to determine whether the indicator is providing the first indication; and
  generating an alarm signal with the central control circuit in response to determining that the indicator is providing the first indication.

11. The method of claim 10, wherein operating the indicator to provide the first indication comprises operating a light source to illuminate in a first color; and operating the indication to provide the second indication comprises operating a light source to illuminate in a second color.

12. The method of claim 10, wherein operating the indicator to provide the first indication comprises operating a screen to display first textual information; and operating the indication to provide the second indication comprises operating a screen to display second textual information.

13. The method of claim 10, wherein operating the indicator to provide the first indication comprises providing the first indication in non-visible light.

14. The method of claim 10, wherein the first indication comprises a pattern; and generating the alarm signal further comprises generating an alarm signal in response to determining that the pattern is interrupted or obscured.

15. The method of claim 10, further comprising:
  monitoring use of the product carrier with a motion or tension sensor;
  generating a signal to the central control circuit in response to a predetermined amount of time passing without the motion or tension sensor providing a use indication; and
  creating a task with the central control circuit for an associate to retrieve the product carrier.

16. The method of claim 10, further comprising operating the indicator with the control circuit to provide a third indication on the exterior of the product carrier in response to determining that there is an unidentified product in the product carrier interior.

17. The method of claim 10, further comprising operating the indicator with the control circuit to provide a fourth indication on the exterior of the product carrier in response to determining that the control circuit is not synced with the user communication device.

18. The method of claim 10, further comprising:
  determining whether any of the products in the product carrier interior are perishable with the control circuit; and
  operating the indicator to provide a perishable indication after a predetermined amount of time has passed in response to determining that at least one product in the product carrier interior is perishable.

* * * * *

UNITED STATES PATENT AND TRADEMARK OFFICE
CERTIFICATE OF CORRECTION

PATENT NO. : 10,467,609 B2
APPLICATION NO. : 15/962263
DATED : November 5, 2019
INVENTOR(S) : Jimmie R. Clark et al.

Page 1 of 1

It is certified that error appears in the above-identified patent and that said Letters Patent is hereby corrected as shown below:

On the Title Page

Item (54), and in the Specification, Column 1, Line 1, In the Title, delete "PRODUCTS" and insert --PRODUCT--.

Signed and Sealed this
Twenty-fifth Day of February, 2020

Andrei Iancu
*Director of the United States Patent and Trademark Office*